May 4, 1954  D. C. PRINCE  2,677,430
CYCLIC PITCH CONTROL FOR ROTARY WING AIRCRAFT
Filed Jan. 3, 1949  2 Sheets-Sheet 1
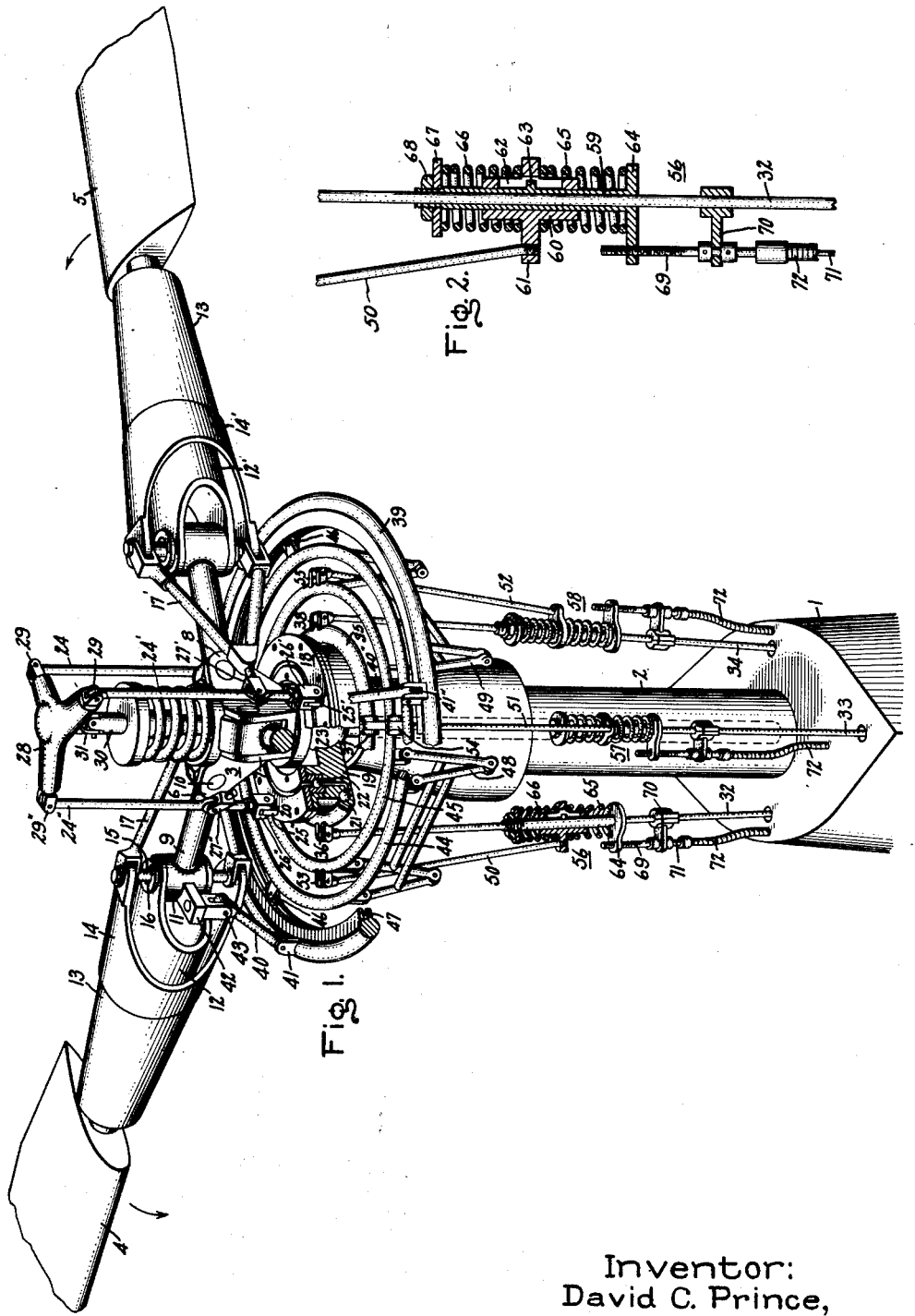
Inventor:
David C. Prince,
by Richard E. Hosley
His Attorney.

May 4, 1954  D. C. PRINCE  2,677,430
CYCLIC PITCH CONTROL FOR ROTARY WING AIRCRAFT
Filed Jan. 3, 1949  2 Sheets-Sheet 2
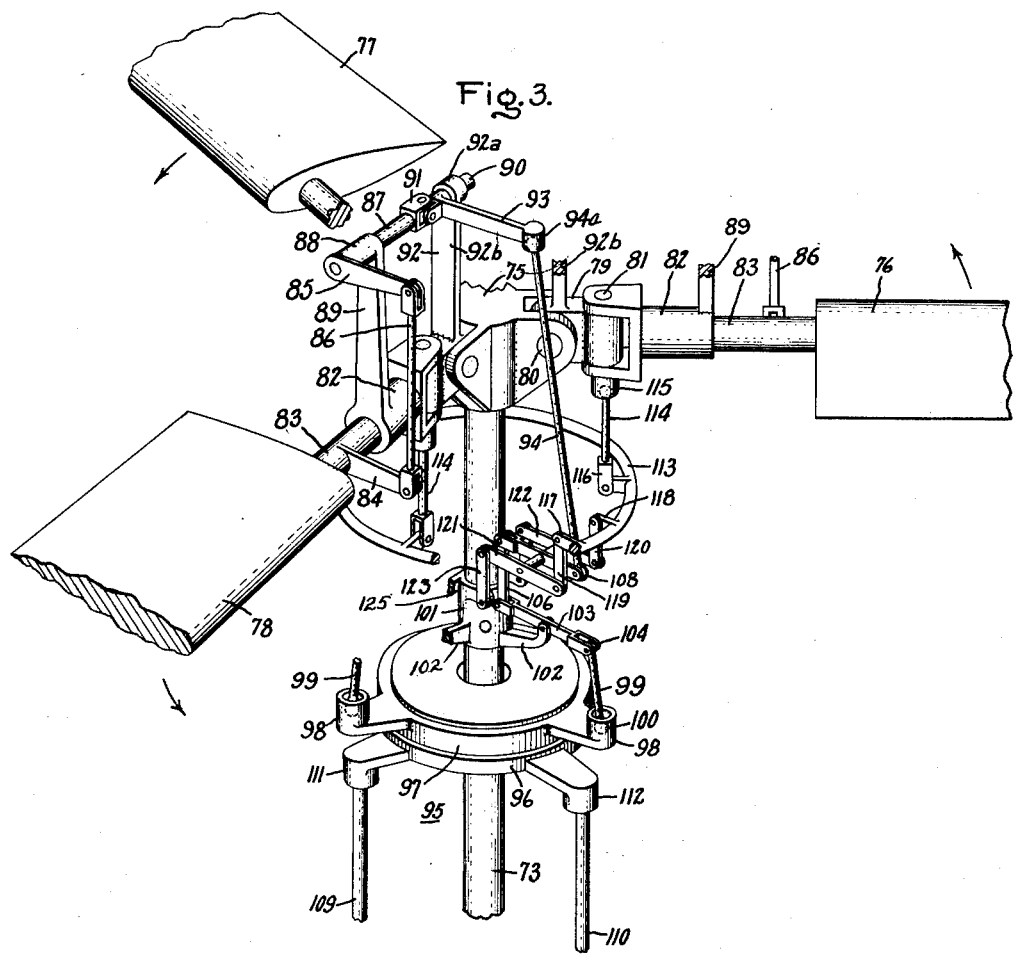
Inventor:
David C. Prince,
by Richard E. Horley,
His Attorney.

Patented May 4, 1954

2,677,430

UNITED STATES PATENT OFFICE 2,677,430

CYCLIC PITCH CONTROL FOR ROTARY WING AIRCRAFT

David C. Prince, Schenectady, N. Y., assignor to General Electric Company, a corporation of New York Application January 3, 1949, Serial No. 68,864

7 Claims. (Cl. 170—160.25)

This invention relates to rotary wing aircraft having one or more bladed sustaining rotors and is more particularly concerned with a novel arrangement for effecting cyclic pitch adjustment of the rotor blades whereby improved control of the aircraft is obtained. This invention is applicable to all rotary wing aircraft utilizing cyclic pitch adjustment of the rotor blades including helicopters or autogyros.

Rotary wing aircraft utilizing a bladed sustaining rotor for lift are customarily provided with mechanism for cyclically varying the pitch of the rotor blades as they rotate. This mechanism usually comprises a rotary swash member, which is tiltable about the axis of the rotor hub and is connected by linkages to the pitch control levers of the rotor blades. The pilot controls the direction of movement of the aircraft by tilting the swash member in the proper direction, which in turn causes a cyclic variation in pitch of the blades, the result of which is to tilt the effective plane and lift line of the rotor. Thus, for example, to proceed forward the pilot tilts the swash member forward; to go backward, he tilts the swash member backward; and to go sideways, he tilts the swash member sideways, etc.

For hovering, or flight in any direction, the pilot must position and hold the swash member in an attitude relative to the rotor plane corresponding to the desired flight condition. Since the fuselage of a rotary wing aircraft is suspended below the sustaining rotor, it is subject to considerable pendular swinging which may be caused by accelerations, wind gusts, etc. This swinging movement of the fuselage is transmitted through the hand of the pilot and the swash member control and causes a corresponding movement of the swash member relative to the rotor. This results in an unstable operating condition, and in order to keep the aircraft on an even keel, the pilot has continuously to adjust his control to compensate for the swinging movement of the fuselage. This results in pilot fatigue and makes the aircraft difficult to fly.

Accordingly, it is an object of this invention to provide a new and improved control arrangement for the sustaining rotor of a rotary wing aircraft which facilitates pilot control and results in more stable operation of the aircraft.

Another object of the invention is to provide a new form of rotary wing control by means of which the pilot can adjust the lift direction of the rotor in any direction for a desired flight condition and thereafter this adjustment is maintained automatically without further attention from the pilot.

A further object of the invention is to provide a rotary wing control that is unaffected by swinging of the fuselage relative to the plane of the rotor.

A still further object of the invention is to provide a control accessory which can easily be applied to existing rotary wing control systems to improve stability.

Further objects and advantages of my invention will become apparent as the following description proceeds and the features of novelty which characterize this invention will be pointed out with particularity in the claims annexed to and forming a part of this specification.

Briefly, in accordance with the preferred illustrated embodiment of this invention, the foregoing objects are attained by providing both manual and automatic means for cyclically varying the rotor blade pitch. The manual cyclic pitch control permits the pilot to adjust the rotor plane for the desired condition of flight. The automatic cyclic pitch control then acts to apply the correct cyclic pitch to maintain the rotor plane in a position which has been preset by the pilot by operation of the manual control. The automatic cyclic pitch control depends for its operation entirely upon the interaction of the rotor blades during rotation and is, therefore, independent of any relative movement between the rotor blades and the fuselage. The automatic cyclic pitch control is, therefore, unaffected by any pendular swinging of the fuselage relative to the rotor. Thus, once the pilot has adjusted the rotor blades for the desired condition of flight, he may release the controls, thereby obviating the need for constant attention to keep the aircraft in the desired flight attitude. Furthermore, stable flight is assured since any swinging of the fuselage has no effect on the operation of the automatic cyclic pitch control.

For a better and more complete understanding of the present invention, reference should be made to the following detailed description and to the accompanying drawings in which:

Fig. 1 is a perspective view, partly in section, of the sustaining rotor of a rotary wing aircraft having manual and automatic cyclic blade pitch control constructed in accordance with this invention;

Fig. 2 is a detailed sectional view of a part of the control shown in Fig. 1 illustrating certain constructional details;

Fig. 3 illustrates a modified form of the invention which is especially well suited for application to helicopters of conventional construction, although its use is not limited thereto; and Fig. 4 is an enlarged view of a portion of Fig. 3 showing constructional details.

Referring now to Fig. 1 of the drawing, there is shown a rotary wing aircraft having a fuselage 1 which is suspended from a sustaining bladed rotor by means of a vertical mast 2. Mounted on the upper end of mast 2 is a rotary hub 3 to which are connected three rotor blades, two of which are shown and numbered 4 and 5. The showing of the third blade is omitted for the purpose of clarity. The hub may be power driven as in a helicopter, or it may be driven by autorotation of the blades as in an autogyro. Each of the three blades is pivotally mounted upon the rotor hub 3, for which purpose there are provided three equally-spaced rotor blade mounts 6, 7, and 8. The rotor blades are of identical construction, and for that reason corresponding parts are assigned the same numerals except that they are primed to differentiate between the blades. Each of the rotor blades has a root member 9, the inner end of which is pivotally mounted on the rotor hub mount, which is numbered 6 in the case of rotor blade 4, by means of a pivot 10. The pivot 10 permits the rotor blade to flap up and down during rotation of the rotor, the axis of this pivot being termed the "flapping axis" in the subsequent description and claims. The outer end of the root member 9 carries a bearing member 11, upon which is pivotally mounted an inner sleeve member 12 which can pivot relative to the root member 9 about a vertical axis, usually referred to as the "lead-lag axis." The outer end of the inner sleeve member is connected to the blade 4 by means of a thrust bearing, not shown, which permits the blade 4 to be rotated about its longitudinal axis to adjust the blade pitch. The blade is connected to an outer sleeve member 13 having at its inner end a yoke 14, the yoke carrying a pin 15 which extends through an opening 16 in bearing member 11.

In order to rotate each blade about its longitudinal axis and thereby change its pitch, there is provided an offset V-shaped lever 17, one end of which is coupled to the yoke 14 by means of the pin 15. The hole 16 in the bearing member 11 is made large enough to permit sufficient rotation of the sleeve 13 and the blade 4 upon vertical movement of the inner end of lever 17 to provide the required pitch adjustment of the blade.

In order to control the rotor plane and consequently the lift direction of the rotor, cyclic pitch mechanism is provided to periodically oscillate the inner ends of the pitch levers 17 up and down during rotation of the rotor blade, which action causes a corresponding oscillation in blade pitch. This cyclic pitch control mechanism comprises a swash member, indicated generally at 18. The swash member comprises a stationary swash plate 19 carrying a rotatable swash ring 20 which is mounted thereon by means of ball bearings 21 and 22 so as to be coaxial with the axis of the hub 3. To permit tilting of the swash member relative to the axis of the rotor hub, the swash plate 19 is mounted on a stationary ball member 23 supported on the mast 2.

For the purpose of coupling the swash ring 20 to the pitch levers 17, there are provided three upstanding rods 24 which are connected to the lugs 25 on swash ring 20 by clevis connections 26. The rods 24 are in turn connected to the ends of pitch levers 17 by means of clevis connections 27.

When the blades rotate with the swash member 18 in a tilted position, the rods 24 and the pitch levers 17 undergo a periodic and differential vertical movement which results in a periodic and differential variation in pitch of the rotor blades. In order to maintain the rods in a properly spaced relation and to accommodate their differential movement, their upper ends are connected to a universally mounted three-legged member 28 by means of pivot connections 29, the member 28 being universally supported on a rotatable shaft extension 30 by means of a universal coupling 31.

The pilot controls the rotor plane and lift direction from the cockpit by means of a mechanism which permits him to tilt the swash member 18 in any desired direction. For this purpose, there are provided three vertically movable control rods 32, 33, and 34, the upper ends of which are connected to a bead 35 forming a part of the swash plate 19. These control rods are connected to the bead 35 by means of ball joints 36, 37 and 38 at 90 degree intervals. The mounting arrangement is such that when the control rod 33 is moved up and down, the swash member 18 is tilted forward and backward relative to the fuselage. The control rods 32 and 34 are connected to diametrically opposite points of the ring 35 so that they move simultaneously in opposite directions. When the control rod 32 moves downwardly and the control rod 34 upwardly, the swash plate 18 is tilted sideways in one direction relative to the fuselage, and when the rods 32 and 34 are moved in the opposite direction, the swash member tilts sideways in the opposite direction relative to the fuselage.

In the interest of simplicity and clarity, a showing of the pilot control lever has been omitted, since it may be of conventional construction and forms no part of the present invention. However, it will be understood that this control lever may comprise a vertical lever or "stick" universally mounted and connected to the control rods 32, 33, and 34 by a suitable arrangement of bell cranks and levers or the like. Preferably, the arrangement is such that when the pilot pushes his stick forward or pulls it back, the control rod 33 moves upwardly or downwardly and tilts the swash member 18 in a forward or backward direction. When the pilot moves the control stick sideways, the control rods 32 and 34 are actuated to tilt the swash member sideways in the same sense, i. e. when the pilot pushes the control stick to the left side, the swash member tilts to the left, and when he pushes it to the right, the swash member tilts to the right. Obviously, by a combination of forward, backward, and sideward movements of the control stick, the swash member may be tilted in any direction.

When the pitch of the rotor blades is varied cyclically as the result of the tipping of the swash member, the blades oscillate up and down about their flapping axes as they progress around the rotor axis. If the tilt of the swash member is in a proper direction to cause the blades to reach the lowest point when they pass the front of the fuselage and the highest point when they pass the rear, the effective plane of the rotor is tilted forward and the aircraft will move in a forward direction. If the swash member is tilted to cause the blades to reach their lowest position when passing to the left side of the fuselage, facing forward, and reach the highest point when they pass the right side, the direction of the rotor will be tilted to the left and the aircraft will move sideways to the left. Similarly, the aircraft will be caused to be moved in any other direction, depending upon the direction of the tilt of the swash member.

In connection with rotor blades subjected to cyclic variations in blade pitch, the maximum swing of the rotor blade about its flapping axis occurs approximately 90 degrees after the occurrence of the maximum pitch change causing the swing of the blade. Thus, for example, if it is desired to have the blade reach its highest position when it passes the front of the fuselage, it is necessary that the maximum blade pitch occur when the blade projects laterally of the fuselage. In order to provide compensation for this phase-lag effect, it will be noted that each pitch lever 17 is connected to the swash ring 20 at a point preferably approximately 90 degrees removed from the blade controlled by the pitch lever. Thus it will be noted, for example, when the swash member is tilted backward toward the observer, Fig. 1, the rod 24' and pitch lever 17' will be at the lowest position and blade 5 will be rotated about its longitudinal axis to the maximum pitch position when it reaches the athwart-ship position to the right of the fuselage. This will cause the blade to reach its highest position when it has rotated 90 degrees to become aligned with the longitudinal axis of the fuselage extending to the front. When the blade reaches the athwart-ship position to the left, the rod 24' of the pitch lever 17' will be at the highest position resulting in a rotation of the blade about its longitudinal axis to the minimum pitch position. This will cause the blade to swing to its lowest position about its flapping axis when it has rotated an additional 90 degrees to become aligned with the longitudinal axis of the fuselage to the rear. The automatic cyclic pitch control aspect of this invention, to be described, utilizes advantageously this phase-lag effect which will be referred to in the subsequent description.

The construction thus far described is known. This invention constitutes an additional control which may be added to that already described to obtain improved stability and ease of control.

In order to obtain a clearer understanding of the operation and advantages of the additional control to be described, it is believed desirable to discuss briefly difficulties which are encountered when flying an aircraft constructed as thus far described before the addition of the supplementary control forming this invention.

Since the fuselage 1 is suspended by the mast 2 a considerable distance below the rotor blades, it is subject to pendular swinging due to wind gusts, accelerations, etc. This results in inherent operational instability, as will be apparent from the following considerations. As pointed out before, the pilot must hold the swash member 18 tilted in the direction in which it is desired to tilt the lift line of the rotor to cause the aircraft to proceed in the desired direction. This means that he must hold his control stick in the properly displaced position, and his hand thereby provides a rigid connection between the swash plate and the fuselage. Therefore, it will be apparent that if the fuselage swings about the center of the rotor hub, the swash plate will be forced to swing with it, which results in a tilting of the rotor lift line in a direction opposite to the direction of fuselage swing. This causes the aircraft to be accelerated in the direction of tilt which results in a still further swinging of the fuselage in the same direction. Thus, a cumulative action is built up which, if uncompensated for by the pilot, will cause the aircraft to overturn. Therefore, in order to keep the aircraft on an even keel, the pilot must continuously move his control stick in a direction to compensate or cancel out the effect of any swinging of the fuselage. This need for continuous compensation causes pilot fatigue and makes the aircraft difficult to fly.

According to the present invention, the mechanism now to be described is added to and cooperates with that previously described to eliminate the control difficulties set forth above.

In order to eliminate inherent instability of control, an arrangement is provided which automatically applies the proper cyclic pitch variation to the rotor blades to maintain the rotor plane in a direction to which it is adjusted by previous tilting of the swash member 18 by the pilot.

The automatic cyclic pitch control depends for its operation on the interaction of the blades as they rotate about the rotor axis. More specifically, an arrangement is provided whereby the position of each blade about its flapping axis controls the pitch of the following blade in such a manner that each blade is caused to be steered up and down in the path of the preceding blade during rotation. Thus, once the rotor plane is tilted by a manual tilting of the swash plate 18, and as a result the blades are caused to swing up and down about their flapping axes as they rotate, this action will continue after the manual control of the swash plate is released because of the fact that the rotor blades steer themselves automatically in the flapping pattern preset by the pilot.

Turning now to the details of the automatic cyclic pitch control mechanism, there is provided a stabilizer member 39 illustrated in the form of a ring surrounding and concentric with the axis of the rotor hub 3. The stabilizer 39 is connected to and supported by links 40 connected to bearing members 11. While only one of the links is completely shown, it will be understood that there are two other similar links extending between the bearing member of the other two blades and the ring, whereby the stabilizer ring is supported at three points, each point being below the blade to which the link is connected. The lower end of each link 40 is attached to the stabilizer ring by means of a pivot connection 41, while the upper end of each of the links is connected to a bracket 42 attached to the bearing member 11 by means of a pivot connection 43. It will be noted that the points of attachment of the links 40 to each of the three blades are displaced outwardly a considerable distance from the flapping axes of the blades. Therefore, as the blades flap up and down about pivots 10, the links 40 undergo a vertical movement. Since the stabilizer ring is attached to and rotates with the blades, it establishes a plane which is parallel with the effective plane of the rotor blades. Thus, when the swash plate 18 is tilted, and as a result the plane of the rotor blades tilts, the stabilizer ring 39 undergoes a corresponding tilting movement.

By means of mechanism now to be described, the stabilizer ring 39 is coupled to the swash member 18 whereby the stabilizer ring and swash member tilt in unison so that the swash plate is maintained in a tilted position preset by the pilot. For this purpose, there are provided two additional rings, an intermediate ring 44 and an inner ring 45, both of these rings being concentric with the stabilizer ring 39 and coaxial with the axis of the rotor hub 3. The intermediate ring 44 is supported on the stabilizer ring by means of rollers 46 which are guided in a track 47 disposed on the inner periphery of the stabilizer ring. These rollers permit the ring 44 to be stationary while the stabilizer ring rotates, but act to maintain parallelism between the planes of the rings.

The inner ring 45 is connected to the intermediate ring 44 by a mechanism which maintains parallelism between the rings 45 and 44 but which permits relative axial movement therebetween. This mechanism comprises two H-shaped scissors linkages 48 and 49 which are connected to the rings 44 and 45 as shown. In order that parallelism between the rings 44 and 45 will be insured, these linkages are displaced from each other by an angle which is something less than 180 degrees. The linkages 48 and 49 allow for vertical movement of the rings 39 and 44 incident of the coning of the blades at various angles during different conditions of flight, while maintaining the inner ring 45 in a reference plane determined by the plane of the stabilizer ring 39. This arrangement permits the inner ring 45 to be coupled directly to the swash member 18 through control rods 32, 33 and 34 by means of three links 50, 51 and 52 connected to the ring at 90 degree intervals by pivot connections 53, 54 and 55.

In order to permit the pilot to forcibly displace the swash member 18 relative to the inner ring 45, the links 50, 51 and 52 are coupled to the control rods 32, 33 and 34 by means of three spring assemblies indicated generally at 56, 57 and 58. Fig. 2 of the drawing shows the constructional details of spring assembly 56. It will be understood, however, that the construction of the other spring assemblies 57 and 58 is identical.

The spring assembly 56 is shown as comprising a tube 59 which is freely slidable on the control rod 32. Mounted for sliding movement on the tube 59 is a sleeve member 60 having an outwardly extending central flange 61, to which the lower end of the link 50 is attached. A limited amount of sliding of the sleeve 60 on the tube 59 is permitted by means of an axially extending slot 62 in the sleeve into which projects a guide pin 63 extending outwardly from the tube 59. Extending between the lower surface of flange 61 on sleeve 60 and a flange 64 attached to the lower end of tube 59 is a coiled compression spring 65. The axial force exerted by compression spring 65 is balanced by means of another compression spring 66 extending between the upper surface of flange 61 on sleeve 60 and a washer 67 which is held in place on the upper end of tube 59 by means of a nut 68 threadedly engaging the upper end of the tube. The tube 59 is adjustably connected to the control rod 32 by means of a screw 69 which threadedly engages the flange 64 on the lower end of the tube. This screw is rotatably supported on a bracket 70 which is clamped to the control rod 32.

The spring assembly 56 permits the rod 32 to be moved relative to the link 50 by application of sufficient force to overcome the resistance provided by the springs 65 and 66. Thus, for example, if the link 50 is considered fixed and an upward force is exerted on control rod 32, this force will be transmitted through screw 69 to flange 64 and tube 59 which will be moved upwardly, compressing spring 65 and permitting expansion of spring 66. On the other hand, if rod 32 is moved downwardly, washer 67 exerts a compressing force on spring 66 and the downward movement of flange 64 permits spring 65 to expand. Therefore, the action of the spring assemblies makes it possible for the pilot, by exerting force on the control rods 32, 33 and 34 through his control lever, to forcibly displace and tilt the swash member 18 relative to the plane established by the rings 39, 44, and 45.

The screw 69 provides a trim adjustment, by means of which the relative position of the link 50 and the rod 32 may be adjusted without disturbing the balance of the forces exerted by springs 65 and 66. Thus, for example, if the screws 69 are rotated so that the distance between the flange 64 and the bracket 70 is increased, rod 32 will be moved downwardly relative to link 50 and vice versa. In order to enable the pilot to adjust the trim screws from the cockpit to secure a condition of equilibrium, flexible and rotatable shafts 71 are provided which lead from each of the trim screws 69 to suitable hand wheels in the cockpit which are not shown. The flexible shafts are guided by means of flexible sheaths 72.

In describing the operation of this invention, it will be assumed that the pilot initially positions the control rods 32, 33 and 34 by means of his control lever so that the swash member 18 is horizontal. For this condition, there will be no cyclic variation in the pitch of the blades and the plane of the rotor will, therefore, be horizontal. For this condition, the stabilizer ring 39, which is connected to the blades by the links 40, will also be horizontal as will be the rings 44 and 45 which are coupled thereto. Assuming that the observer in Fig. 1 faces the front of the aircraft and that the rotation of the blades is as indicated by the arrows, let it be supposed that the pilot now desires to maneuver the aircraft sidewise, say to the left. To do this, he actuates his control lever so as to move rod 32 downwardly and rod 34 upwardly, which movement is transmitted directly to the swash plate 19 through the connections 36 and 38. Due to the fact that the rotor blades have considerable inertia and tend to maintain their plane of rotation, the rings 39, 44 and 45 momentarily resist any tilting force exerted thereon through the rods 50 and 52 so that these rods are relatively fixed. However, the spring assemblies 56 and 58 allow the pilot to overpower the resistance offered by the rods 50 and 52 and permit relative tilting between the swash member and the stabilizer ring by overpowering the biasing springs 65 and 66. As a result of tipping of the swash member to the left, cyclic pitch variation is applied to the rotor blades, whereupon the plane of the rotor tilts to the left as described above. When the rotor plane has been tilted the desired amount, the pilot releases his control lever and the required amount of cyclic pitch variation to maintain this plane of rotation of the rotor blades is applied automatically. This occurs because upon a tilting of the rotor plane to the left, the stabilizer ring is correspondingly tilted due to its connection of the rotor blades to the links 40. Since the rings 44 and 45 are constrained to move with the stabilizer ring, the swash member is maintained in a tilted position preset by the pilot through the action of the rods 50 and 52 which are coupled to and position the control rods 32 and 34 through the spring assemblies 56 and 58.

If the pilot desires to restore the rotor to horizontal position, he actuates his control lever to cause rods 32 and 34 to move against the biasing force offered by the spring assemblies 56 and 58, thereby tilting the swash member back to the horizontal position. This removes the cyclic pitch variation from the blades, whereupon they return to the horizontal plane carrying with them the stabilizer ring 39. This follow-up movement of the stabilizer ring restores the control rods 50 and 52 to their initial position, resetting the spring assemblies 56 and 58 so that the swash member will be maintained in the level position after the pilot releases his control lever.

In a similar manner, the swash member is maintained in any position to the front or rear to which it is tilted by the pilot through vertical movement of the control rod 33. Initial vertical movement of the rod 33 is yieldingly resisted by the spring assembly 56 until after the resulting tilt of the swash member, through application of cyclic pitch variation to the blades, causes the plane of the rotor to be tipped forward or to the rear, as the case may be, bringing the stabilizer ring and the connected rod 51 to a position corresponding to that of the swash member, whereupon the pilot control may be released and the swash member will be maintained in this position. Thus, it will be apparent that the manual cyclic pitch control permits the pilot to adjust the plane of the rotor blades at will and the automatic cyclic pitch control thereafter operates to maintain the plane of the rotor blades preset by the manual control.

It is believed that the theory of operation of this invention can best be understood by considering the stabilizer ring 39 and its associated mechanism as a means for controlling the pitch of each rotor blade in accordance with the oscillation of the preceding blade about its flapping axis. Thus, by reference to Fig. 1, it can be seen that as the blade 4 swings upwardly and rotates clockwise about the pivot pin 10, it carries upwardly that part of the stabilizer ring 39 below the blade, tilting the ring to the right. This causes a corresponding tilting of the swash member 18, whereupon the pitch lever 17' of the blade 5 moves downwardly increasing the pitch of the blade. As a result of this increase in pitch, the blade 5 swings upwardly during its subsequent rotation in the path of blade 4. Similarly, when the blade 4 swings downwardly or counterclockwise about its flapping axis, the resulting tilt of the swash member 18 moves the pitch lever 17' upwardly, thereby decreasing the pitch of the blade 5 so that during subsequent rotation thereof, it swings downwardly into the path of the preceding blade 4. The same action occurs in connection with the third blade, not shown, that is, the swinging of this blade about its flapping axis determines the pitch applied to the following blade 4 and the pitch of this blade is in turn determined by the flapping of the preceding blade 5 about its flapping axis. It will be noted that pitch change of each blade caused by the flapping of the preceding blade about its flapping axis is in a direction or sense to steer each blade in the path of the preceding blade. Thus, once the flapping pattern of the blades has been preset by tilting of the swash member 18 by the pilot, this flapping pattern is maintained because of the fact that each blade is steered into the path of the preceding blade. Automatic pitch control of each blade in response to the flapping movement of the preceding blade is possible because of the phase-lag effect referred to above. Because of the 90 degree lag between the change in pitch of a blade and the resulting upward swing of the blade about its flapping axis, the position of the preceding blade about its flapping axis can be used as an indication of what the pitch of the following blade should be in order to have it swing to the same position as the preceding blade when it occupies the position of the preceding blade at which the pitch signal is sent back to the following blade. In a three-bladed rotor structure, such as that illustrated, the rotor blades are, of course, 120 degrees apart. There is, however, a substantial component of the flapping movement of each blade which is 30 degrees behind the blade and 90 degrees ahead of the following blade, this component being used to actuate the pitch control of the following blade. It will be clear that the same principle may be applied to rotors having other than three blades, the only requirement being that the flapping of each blade must have a component approximately 90 degrees ahead of the following blade.

In order for a condition of equilibrium to occur so that the rotor plane will remain tilted in any position to which it is tilted by movement of the swash member 18, the flapping of each blade must change the pitch of the following blade the proper amount to have the following blade swing into the identical path of the preceding blade. Since the swing of each blade about its flapping axis depends not only upon the pitch of the blade, but also upon the speed of the blade through the air, it is clear that the ratio between the flapping movement of each blade and the resulting pitch change of the following blade must be changed in order to maintain a given tilt of the rotor plane for different translational speeds of the aircraft. This ratio is conveniently changed by tilting the swash member 18 relative to the plane of the stabilizer ring 39 by adjustment of the trim screws 69.

From the foregoing description, it will be clear that in order to fly the aircraft, it is only necessary for the pilot to actuate his control lever until the rotor plane has been tilted to the desired position, whereupon he may release his control, permitting the automatic cyclic pitch control mechanism to take over and stabilize the rotor in the plane preset by the pilot. It will be noted that the automatic cyclic pitch control involves only linkages extending between the blades and does not depend for its action upon any connection to the fuselage. Therefore, any swinging of the fuselage relative to the rotor plane does not affect the automatic cyclic pitch control mechanism, and, therefore, cannot result in an unstable operating condition previously encountered in controlling aircraft of this type.

Due to the fact that the pilot control lever is connected directly to the swash member 18 through the control rods 32, 33 and 34, the pilot may at any time overpower the action of the automatic cyclic pitch control mechanism by simply applying sufficient force to his control to overpower the force exerted by springs 65 and 66. Because of this arrangement, stability of the rotor is obtained without in any way sacrificing speed of response of the manual control. This feature is of importance in cases where quick maneuvering is required in some emergency or when maneuvering near objects.

It will be noted that the advantage of automatic cyclic pitch control in accordance with my invention can be obtained by the addition of relatively few parts to conventional construction. Thus, with reference to Fig. 1, automatic cyclic pitch control is obtained by simply adding to conventional construction the concentric rings 39, 44 and 45, the spring assemblies 56, 57 and 58, and the various interconnecting linkages. Such addition does not involve any major design changes, and the apparatus may be easily applied to rotary wing aircraft now designed and in operation. Thus, for example, this apparatus has been applied to an autogyro, and it was found that the pilot could release his control, i. e., fly "hands off" indefinitely with only slight adjustment of the trim screws 69 occasionally to compensate for changes in air speed. This same aircraft without the stabilizing control could not be flown "hands off" for a period longer than about one second.

In Fig. 3 of the drawing, there is illustrated a modified form of the invention which is especially well suited for application to helicopters of conventional construction, although its use is not limited thereto. In this modification, the stabilizing ring does not tilt the swash plate as in Fig. 1, but instead, it interposes an automatic cyclic movement in the linkages extending between the swash plate and the pitch controls of the blades.

Referring now to Fig. 3, there is shown a bladed sustaining rotor which supports the fuselage of a helicopter (not shown) through a shaft 73. Mounted on top of the shaft which is power-driven by an engine (not shown) is a rotary hub 75 on which are mounted three rotor blades 76, 77 and 78. Each blade has an arm 79 pivotally mounted on the hub 75 by means of a pivot pin 80 which permits vertical flapping of the blade about its flapping axis during rotation. Pivotally mounted on the arm 79 by means of a pivot pin 81 is a second arm 82 which permits the blade to swing about a vertical or lead-lag axis. The arm 82 is connected to the blade by a shaft 83 through a thrust bearing (not shown), the thrust bearing acting to permit rotation of the blade about its longitudinal axis to effect a change in pitch. It will be understood that the construction of each of the blades is identical, and for that reason, numerals are assigned only to such parts as are necessary to describe one complete mechanism.

For the purpose of rotating the blades about their longitudinal axis to adjust the pitch thereof, there is connected to the shaft 83 a crank arm 84 which is connected to a second crank arm 85 by means of a link 86. The crank arm 85 is supported on the outer end of a shaft 87 rotatably mounted in a bearing 88 supported on and above the arm 82 by means of a bracket 89. The inner end of shaft 87 is coupled to a second shaft 90 through a universal coupling 91 which permits relative movement between the shaft 87 and 90 incident to swinging of the rotor blades relative to the hub. The shaft 90 is supported in a bearing 92a mounted on an upstanding bracket 92b attached to arm 79. Extending from the shaft 90 is a crank arm 93, the outer end of which is connected to a blade pitch control rod 94 by means of a ball joint 94a.

For the purpose of causing the blades to undergo a manually-adjustable cyclic pitch variation, there is provided a tiltable swash member indicated generally at 95. The swash member is shown as comprising a stationary swash plate 96 and a rotatable swash ring 97, both of which are mounted on the shaft 73 by means of a ball joint (not shown) which permits tilting. The swash ring has three projections 98, each one of which is connected to a pitch control rod 94 of an associated blade through a link 99 connected thereto through a ball joint 100.

It will be understood that the swash ring 97 rotates with the blades and when this ring is tilted relative to the shaft 73, the links 99 undergo an oscillatory movement relative to the shaft. This oscillating movement of the rod 99 is translated to the pitch control rod 94 through a mechanism which will now be described.

Pinned to the shaft 73 and rotatable therewith is a collar 101 from which radially projects a lever supporting arm 102. Pivotally mounted on the arm 102 is a rocker arm 103, the outer end of which is connected to the rod 99 by means of a joint 104. The inner end of rocker arm 103 is connected to a second rocker arm 105 by means of a link 106 extending between the inner ends of arms 103 and 105 and pivotally connected thereto. The rocker arm 105 is supported on a pivot 107 located intermediate its ends, the outer end of the arm being connected to the pitch control rod 94 by means of a joint 108. From a consideration of this mechanism, it will be clear that as the arm 99 moves upwardly relative to shaft 73 during rotation thereof, rocker arms 103 and 105 will pivot counterclockwise, causing an upward movement of pitch control rod 94 and vice versa. It will be understood that similar mechanisms are provided for connecting the other projections 98 to their associated rotor blades.

In order to permit the pilot to manually control the cyclic pitch of the blades at will, there are provided two vertically movable control rods 109 and 110. These rods are connected to the swash plate 96 through projections 111 and 112 extending therefrom, these projections being peripherally displaced approximately 90 degrees to permit tipping of the swash member in any direction.

For the purpose of obtaining automatic cyclic pitch control of the blades, there is provided a mechanism now to be described which superimposes upon the movement of the pitch control rod 94 an additional movement which causes the pitch of each blade to be varied in accordance with the oscillation of the preceding blade about its flapping axis, whereby each blade is steered in the path of the preceding blade.

This mechanism is shown as comprising a stabilizer ring 113 which is comparable in function to the stabilizer ring 39 shown in the embodiment of Fig. 1. The stabilizer ring 113 is suspended from the blades by means of links 114, the upper ends of which are connected to the outer ends of arms 79 by means of ball joints 115, the lower ends of the links being connected to the stabilizer ring by means of joints 116.

In order to transmit the movement of ring 113 to the pitch control rods of the blades, there is provided a system of levers connecting the ring to the pitch control rods 94 through movement of pivots 107 upon which rocker arms 105 are supported, the rocker arms being, in effect, floating levers. In Figs. 3 and 4, the mechanism associated with blade 78 is illustrated and will now be described, it being understood that the mechanisms associated with the other two blades are of the same construction. On the inner periphery of ring 113 at a point approximately 90 degrees ahead of blade 78, there are provided two inwardly projecting arms 117 and 118 arranged on opposite sides of the rocker arm 105. These arms pivotally support a pair of depending levers 119 and 120 which are pivotally connected to the outer ends of levers 121 and 122 and which are parallel to and located on opposite sides of the rocker arm 105. The inner ends of arms 121 and 122 are pivotally connected to depending links 123 and 124, the lower ends of which are pivotally supported on brackets 125 and 126 attached to and extending from the collar 101. The floating pivot 107 of rocker arm 105 is connected to and vertically positioned by the parallel levers 121 and 122 so that any vertical movement of ring 113 imparts a similar vertical movement to pitch control rod 94, this movement being superimposed upon and added to any movement of the pitch control rod 94 caused by oscillation of the rod 99 and the connected rocker arms 103 and 105. Thus, for example, if that part of ring 113 coupled to arms 117 and 118 moves upwardly, levers 121 and 122 will pivot counterclockwise, thereby moving upwardly floating pivot 107. This action causes a corresponding counterclockwise rotation of rocker arm 105 whereby pitch control rod 94 is moved upwardly. Similarly, a downward movement of ring 113 adjacent the supporting arms 117 and 118 causes a downward movement of the rod 94.

It is believed that the operation of this modification of the invention will now be clear in light of the foregoing description. When the pilot desires to tilt the plane of the rotor, he manually tilts the swash member 95 in the proper direction by actuation of the conrtol rods 109 and 110. This causes a cyclic oscillation of the rods 99 and the connected pitch control rods 94 which, in turn, results in a cyclic oscillation in the pitch of the rotor blades during rotation, and as a result of this action, the plane of the rotor blades is tilted. The tilt of the rotor blades causes a corresponding tilt in the plane of the stabilizer ring 113, and since this ring also rotates with the blades, any selected point thereon undergoes a vertical oscillating motion induced by oscillation of the blades about their flapping axes. Because of the connection between the ring and the floating levers 105, movements of the ring 113 are transmitted to the pitch control rods 94. The points of attachment between the control rods 94 and the stabilizer ring are preferably approximately 90 degrees ahead of the blades controlled thereby, and approximately 30 degrees behind the preceding blade. Thus, it will be seen that a substantial component of the oscillation of each blade about its flapping axis is transmitted through the stabilizer ring and causes a corresponding oscillation in pitch of the following blade, the sense of the control being such that each blade is thereby caused to be steered in the path of the preceding blade. Therefore, once the flapping pattern and tilt of the rotor blades has been present by manual tilting of the swash member 95, the automatic cyclic pitch control takes over and operates to stabilize the plane of the rotor blades in the tilted position.

The type of control provided by this modification of the invention may be termed a "rate" control in that the rate at which the plane of the rotor blade tilts depends upon the degree of tilt of the swash member 95. Therefore, this control resembles in its action that which is encountered in flying conventional fixed-wing aircraft, and for that reason it is easier to master by pilots accustomed to rate type of controls.

It will be noted also that with this type of control, the oscillatory motion of rod 99 is affected only by the tilt of the swash member 95 relative to the shaft 73. Therefore, any swinging of the fuselage and the shaft 73 relative to the plane of the rotor blades does not influence the manually applied cyclic pitch control, thereby giving stable operation during manual as well as during automatic cyclic pitch control.

In the above-described embodiments of this invention, the stabilizer member which transmits the flapping movement of each blade to the pitch control of the following blade has been illustrated in the form of a ring. It will be understood, however, that the stabilizer member may have any other desired configuration which best suits the mechanics of the installation. Furthermore, it is contemplated that there may be a separate stabilizer member for each blade rather than one stabilizer member connected to all blades. In such a case, the individual stabilizers would comprise lever means associated with each blade for transmitting the flapping movement of that blade to actuate the pitch control of the following blade in a direction to steer the following blade in a path of the preceding blade.

While particular embodiments of this invention have been shown and described, it will occur to those skilled in the art that various changes and modifications may be made without departing from the invention, and therefore it is aimed in the appended claims to cover all such changes and modifications as fall within the true spirit and scope of the invention.

What I claim as new and desire to secure by Letters Patent of the United States is:

1. For an aircraft, a bladed sustaining rotor comprising a rotary hub and a plurality of blades, means mounting each blade on the hub for flapping, pitch changing and lead-lag movement, a stabilizer member surrounding the axis of said hub means directly connecting said stabilizer member to said blades for correlating the positions of these elements, pitch control means for varying the pitch angle of each of said blades, a tiltable swash member, means connecting the pitch control means of each blade to said swash member to produce cyclic variations in rotor blade pitch, and linkage including a biasing spring connecting said swash member and said stabilizer member to bias said swash member so that it normally tilts in unison with said stabilizer member thereby providing an automatic adjustment of cyclic blade pitch variation, and manually controlled means connected to said biasing means for forcibly overpowering said biasing means and tilting said swash member relative to said stabilizer member to provide cyclic blade pitch adjustment at will.

2. For an aircraft, a bladed sustaining rotor comprising a rotary hub and a plurality of blades, means mounting each blade on the hub for flapping and pitch changing movement, a stabilizer member surrounding the axis of said hub means directly connecting said stabilizer member to said blades for correlating the positions of these elements, pitch control means for varying the pitch angle of each of said blades, a tiltable swash member, linkage connecting the pitch control means of each blade to said swash member to produce cyclic variations in rotor blade pitch, means connecting the swash member and said stabilizer member to bias said swash member so that it normally tilts in unison with said stabilizer thereby providing an automatic adjustment of cyclic pitch variation, said connecting means comprising yielding means, and manually controlled means connected to said biasing means for forcibly overpowering said biasing means and tilting said swash member relative to said stabilizer member to provide cyclic blade pitch adjustment at will.

3. For an aircraft, a bladed sustaining rotor comprising a rotary hub and a plurality of blades, means mounting each blade on the hub for flapping and pitch changing movement, a stabilizer member surrounding the axis of said hub means directly connecting said stabilizer member to said blades for correlating the positions of these elements, pitch control means for varying the pitch angle of each of said blades, a tiltable swash member, means connecting the pitch controlling means of each blade to said swash member to produce cyclic variations in rotor blade pitch, means connecting said swash member and said stabilizer member to bias said swash member so that it normally tilts in unison with said stabilizer thereby providing an automatic adjustment of cyclic pitch variation, said connecting means comprising spring biasing means and mechanical linkage means, and manually controlled means connected to said biasing means for forcibly overpowering said biasing means and tilting said swash member relative to said stabilizer member to provide cyclic blade pitch adjustment at will.

4. For an aircraft, a bladed sustaining rotor comprising a rotary hub and a plurality of blades, means mounting each blade on the hub for flapping and pitch changing movement, a stabilizer member surrounding the axis of said hub means directly connecting said stabilizer member to said blades for correlating the positions of these elements, pitch control means for varying the pitch angle of each of said blades, a tiltable swash member, means connecting the pitch control means of each blade to said swash member to produce cyclic variations in rotor blade pitch, means connecting the swash member and said stabilizer member to bias said swash member so that it normally tilts in unison with said stabilizer thereby providing an automatic adjustment of cyclic pitch variation, said connecting means comprising spring biasing means and mechanical linkage means, said spring biasing means connecting said swash member and an inner member surrounding said swash member, said inner member being connected to an intermediate member by mechanical linkage means to maintain the inner and intermediate members in parallel relation by permitting relative axial movement therebetween, said intermediate member being connected to the stabilizer member for relative coplanar, parallel movement, and manually controlled means for forcibly overpowering said biasing means and tilting said swash member relative to said stabilizer to provide cyclic blade pitch adjustment at will.

5. For an aircraft, a bladed sustaining rotor comprising a rotary hub and a plurality of blades, means mounting each blade on the hub for flapping and pitch changing movement, a stabilizer member surrounding the axis of said hub means directly connecting said stabilizer member to said blades for correlating the positions of these elements, pitch control means for varying the pitch angle of each of said blades, a tiltable swash member, means connecting the pitch control means of each blade to said swash member to produce cyclic variations in rotor blade pitch, means connecting said swash member and said stabilizer member to bias said swash member so that it normally tilts in unison with said stabilizer thereby providing an automatic adjustment of cyclic pitch variation, said connecting means comprising spring biasing and mechanical linkage means, said spring biasing means connecting said swash member and a surrounding, inner member, said inner member being connected to an intermediate member by means of H-shaped scissor linkages which permit relative axial movement in a parallel plane between the inner and intermediate members, said intermediate member being connected to the stabilizer member for coplanar, parallel movement, and manually controlled means connected to said biasing means for forcibly overpowering said biasing means and tilting said swash member relative to said stabilizer member to provide cyclic blade pitch adjustment at will.

6. For an aircraft, a bladed sustaining rotor comprising a rotary hub and a plurality of blades, means mounting each blade on the hub for flapping and pitch changing movement, a stabilizer member surrounding the axis of said hub means directly connecting said stabilizer member to said blades for correlating the positions of these elements, pitch control means for varying the pitch angle of each of said blades, a tiltable swash member, means connecting the pitch control means of each blade to said swash member to produce cyclic variations in rotor blade pitch, means comprising spring biasing means connecting said swash member and said stabilizer member to bias said swash member so that it normally tilts in unison with said stabilizer member thereby providing automatic adjustment of cyclic pitch variation, manually controlled means connected to said biasing means for forcibly overpowering said biasing means and tilting said swash member relative to said stabilizer member to provide cyclic blade pitch adjustment at will, and means for tilting the swash member relative to the plane of the stabilizer member.

7. For an aircraft, a bladed sustaining rotor comprising a rotary hub and a plurality of blades, means mounting each blade on the hub for flapping and pitch changing movement, a stabilizer member surrounding the axis of said hub means directly connecting said stabilizer member to said blades for correlating the positions of these elements, pitch control means for varying the pitch angle of each of said blades, a tiltable swash member, means connecting the pitch control means of each blade to said swash member to produce cyclic variations in rotor blade pitch, means comprising spring biasing means connecting said swash member and said stabilizer member to bias said swash member so that it normally tilts in unison with said stabilizer member thereby providing automatic adjustment of cyclic pitch variation, manually controlled means connected to said biasing means for forcibly overpowering said biasing means and tilting said swash member relative to said stabilizer member to provide cyclic blade pitch adjustment at will, and means for tilting the swash member relative to the plane of the stabilizer member to change the ratio between the flapping movement of each blade and the pitch change of the following blade, said means comprising a trim screw adjustment.

References Cited in the file of this patent

UNITED STATES PATENTS

| Number | Name | Date |
|---|---|---|
| 2,256,635 | Young | Sept. 23, 1941 |
| 2,256,918 | Young | Sept. 23, 1941 |
| 2,368,698 | Young | Feb. 6, 1945 |
| 2,444,070 | Stanley | June 29, 1948 |
| 2,529,479 | Bates | Nov. 14, 1950 |